(12) United States Patent
Cariou et al.

(10) Patent No.: US 11,808,172 B2
(45) Date of Patent: Nov. 7, 2023

(54) TURBINE ENGINE VANE EQUIPPED WITH A COOLING CIRCUIT AND LOST-WAX METHOD FOR MANUFACTURING SUCH A VANE

(71) Applicants: SAFRAN, Paris (FR); SAFRAN AIRCRAFT ENGINES, Paris (FR)

(72) Inventors: Romaine Pierre Cariou, Moissy-Cramayel (FR); Vianney Simon, Moissy-Cramayel (FR); Myriam Pelleterat De Borde, Moissy-Cramayel (FR); Adrien Bernard Vincent Rollinger, Moissy-Cramayel (FR)

(73) Assignees: Safran, Paris (FR); Safran Aircraft Engines, Paris (FR)

( * ) Notice: Subject to any disclaimer, the term of this patent is extended or adjusted under 35 U.S.C. 154(b) by 163 days.

(21) Appl. No.: 17/439,580

(22) PCT Filed: Mar. 16, 2020

(86) PCT No.: PCT/FR2020/050564
§ 371 (c)(1),
(2) Date: Sep. 15, 2021

(87) PCT Pub. No.: WO2020/193912
PCT Pub. Date: Oct. 1, 2020

(65) Prior Publication Data
US 2022/0154584 A1    May 19, 2022

(30) Foreign Application Priority Data
Mar. 22, 2019 (FR) ........................ 1903019

(51) Int. Cl.
B22D 25/02 (2006.01)
B22C 7/02 (2006.01)
F01D 9/02 (2006.01)

(52) U.S. Cl.
CPC .................. *F01D 9/02* (2013.01); *B22C 7/02* (2013.01); *B22D 25/02* (2013.01); *F05D 2230/21* (2013.01)

(58) Field of Classification Search
CPC .... B22C 7/02; B22C 9/00; B22C 9/10; B22C 9/103; B22C 9/108; B22D 25/02
See application file for complete search history.

(56) References Cited

U.S. PATENT DOCUMENTS

| 4,650,399 A | 3/1987 | Craig et al. |
| 2007/0140851 A1 | 6/2007 | Hooper et al. |
| 2019/0211693 A1 | 7/2019 | Rollinger et al. |

FOREIGN PATENT DOCUMENTS

| EP | 1734229 A2 | 12/2006 |
| EP | 2374997 A2 | 10/2011 |
| FR | 3056631 A1 | 3/2018 |

OTHER PUBLICATIONS

International Search Report received for PCT Patent Application No. PCT/FR2020/050564, dated Jul. 27, 2020, 6 pages (2 pages of English Translation and 4 pages of Original Document).

*Primary Examiner* — Kevin P Kerns
*Assistant Examiner* — Steven S Ha
(74) *Attorney, Agent, or Firm* — WOMBLE BOND DICKINSON (US) LLP

(57) ABSTRACT

The invention relates to a turbine engine vane including a blade extending along a radial axis and a first cooling circuit arranged inside the blade, the first cooling circuit including a first cavity and a second cavity disposed downstream of the first cavity in a direction of circulation of a coolant in the blade, the first and second cavities radially extending inside (Continued)

the blade and being at least partly separated by a first radial partition having a radially internal free end, which at least partly demarcates a first coolant passage connecting the first and second cavities. According to the invention, the radially internal free end is enlarged by having a general transverse section substantially in the form of a keyhole.

10 Claims, 2 Drawing Sheets

TURBINE ENGINE VANE EQUIPPED WITH A COOLING CIRCUIT AND LOST-WAX METHOD FOR MANUFACTURING SUCH A VANE

FIELD OF THE INVENTION

The present invention concerns the field of turbine engines and in particular a turbine engine vane equipped with a cooling circuit intended to cool it. It also relates to a lost-wax manufacturing method using a set of metal casting cores.

TECHNICAL BACKGROUND

The prior art includes the documents FR-A1-3 056 631, U.S. Pat. No. 4,650,399, EP-A2-2 374 997, US-A1-2007/140851, and EP-A2-1 734 229.

The turbine engine vanes, in particular, high-pressure turbine vanes, are subject to very high temperatures that can shorten their service life and degrade the performance of the turbine engine. The turbines of the turbine engine, indeed, are arranged downstream of the combustion chamber of the turbine engine, which ejects a hot gas flow that is expanded by the turbines and allows them to be driven in rotation to operate the turbine engine. The high-pressure turbine, which is located directly at the outlet of the combustor, experiences the highest temperatures.

In order to enable the turbine vanes to withstand these severe thermal stresses, it is known to provide a cooling circuit in which relatively cooler air circulates which is taken from the compressors, the latter being located upstream of the combustion chamber. More precisely, each turbine vane comprises a blade with a pressure wall and a suction wall which are connected upstream by a leading edge and downstream by a trailing edge.

The cooling circuit comprises several cavities inside the blade of the vane, some of which communicate with each other and which are supplied with cooling air from the root of the vane, some of this cooling air flowing into outlet orifices which are located in the vicinity of the trailing edge. These orifices deliver cooling air jets onto the walls of the blade.

It is known that the cooling circuit comprises several partitions extending radially in the blade so as to form "rising" and "falling" cavities arranged successively in the direction of circulation of the cooling air and which communicate with each other by curved passages. These cavities and passages are known as a "trombone" circuit. The curved passages are formed respectively by the free ends of the partitions, each of which has a curvature or reversal of the partition. Each partition connects a first wall to a second wall which are transversely opposite in the blade. This allows a large area within the blade to be swept for cooling.

The blade may include other cavities from other independent circuits, and which are arranged in the vicinity of the trombone circuit, for example on the side of the pressure wall or suction wall. The curved passages are in this case reduced in order to place the different circuits in the master pair of the blade. In particular, the circuits with cavities are usually realised by independent metal casting cores which are exploited in a method for manufacturing the vane using the lost-wax metal casting technique. The cores may be placed too close together and thus create material sub-thicknesses in the material of the partitions. The sub-thicknesses may be due to deformation of a metal casting core during the firing of the core, the injection of wax around the cores, the firing of the shell (usually made of refractory material) enveloping the wax and cores or the pouring of molten metal into the shell, or poor holding of the cores.

The sub-thicknesses of material on the partition are strongly mechanically stressed due to the presence of strong thermal gradients between the inside and outside of the blade, which induces an expansion space.

SUMMARY OF THE INVENTION

The objective of the present invention is to reduce the localised mechanical stresses experienced by the blade due to the arrangement of a cooling circuit while avoiding significant structural changes to the vane.

This is achieved in accordance with the invention by a turbine engine vane comprising a blade extending along a radial axis and a first cooling circuit arranged inside the blade, the first cooling circuit comprising a first cavity and a second cavity disposed downstream of the first cavity in a direction of circulation of a coolant in the blade, the first and second cavities extending radially inside the blade and being at least partly separated by a first radial partition having a radially internal free end which at least partly demarcates a first coolant passage connecting the first and second cavities, the radially internal free end being enlarged by having a general transverse section substantially in the form of a keyhole.

Thus, this solution achieves the above-mentioned objective. In particular, such a form allows the stresses to be spread over a larger area at the radially internal free end of the first partition, thereby increasing the service life of the vane.

The vane also comprises one or more of the following features, taken alone or in combination:
  the blade comprises a pressure wall and a suction wall connected upstream by a leading edge and downstream by a trailing edge.
  the first partition extends along a transverse axis perpendicular to the radial axis between the pressure wall and the suction wall.
  the first cooling circuit comprises a third cavity disposed upstream of the first cavity in the direction of circulation of the coolant, the third cavity and the first cavity being separated by a second radial partition having a radially external free end and being connected by a second coolant passage which is at least partly demarcated by the radially external free end.
  the radially external free end comprises a general transverse section substantially in the form of a keyhole.
  the second partition extending substantially between the pressure wall and the suction wall.
  the blade comprises a second cooling circuit comprising a pressure cavity disposed on the one hand adjacent to a pressure wall of the blade and on the other hand between the third cavity and the second cavity along the direction of circulation of the coolant in the blade.
  the radially internal free end has a circular or semi-circular transverse section with a predetermined radius R2, the value of which is between 1.2 times a nominal radius R1 and 2 times the nominal radius R1, the nominal radius R2 being the radius of the radially internal free end having a fillet with a circular section.

The invention also relates to a metal casting assembly for the manufacture of a turbine engine vane comprising any one of the above features, the assembly comprising a first core elongated along a radial height and which comprises a first wing intended to form the first cavity and a second wing intended to form the second cavity, the first and second wings being spaced apart by a first space substantially constant along a majority of their radial height and being connected at one of their first ends, the first space being intended to form the first radial separating partition between the first and second cavities of the blade, the first space is enlarged at the first ends of the first and second wings by having a transverse section substantially in the form of a keyhole.

The metal casting assembly also comprises one or more of the following features, taken alone or in combination:

- the first wing is defined in a median plane PM1 which is substantially orthogonal to the median plane PM2 in which the second wing is defined.
- the first core comprises a third wing intended to form the third cavity which is connected at its second end to a second end of the first wing, the first wing and the third wing being spaced apart along a second space substantially constant along a majority of their radial height
- the second space is enlarged at the second ends of the first and third wings by having a transverse section substantially in the form of a keyhole.
- the metal casting assembly comprises a second core elongated along the radial height and an elongated connecting element at least partly accommodated in the first space enlarged along a transverse direction perpendicular to the radial height and configured to hold the second core in position with respect to the first core.
- the connecting element has a circular cross-section with a form-fit to the first space which is enlarged, the connecting element being radially locked in the first space which is enlarged.
- the first core is configured to form the first cooling circuit.
- the second core is configured to form the second cooling circuit.
- the first and second cores comprise a ceramic material.

The invention also relates to a method for manufacturing a turbine engine vane as aforesaid, the method using a metal casting assembly having any one of the aforesaid features.

The method further comprises the following steps:
- assembling the first and second metal casting cores with respect to each other with at least one elongate connecting element inserted into the enlarged space in the form of a keyhole in a direction transverse to the radial height of the first and second wings, the second core abutting against the connecting element,
- injecting wax so as to encapsulate the first and second cores assembled with the connecting element and form a pattern,
- manufacturing a shell enveloping the pattern,
- pouring molten metal into the shell to form the turbine engine vane;
- shaking out the shell and the first and second cores so as to release the turbine engine vane and to form the first and second cavities of a first cooling circuit in the blade.

According to the manufacturing method, in the step of pouring molten metal, the connecting element is embedded in the molten metal so as to form a single piece with the blade and to form the radially internal end of transverse section in the form of a keyhole.

The invention further relates to a turbine of a turbine engine comprising at least one turbine engine vane having the above features.

The invention further relates to a turbine engine comprising at least one turbine of the turbine engine as aforesaid.

BRIEF DESCRIPTION OF THE FIGURES

The invention will be better understood, and other purposes, details, characteristics and advantages thereof will become clearer on reading the following detailed explanatory description of embodiments of the invention given as purely illustrative and non-limiting examples, with reference to the appended schematic drawings in which.

DETAILED DESCRIPTION OF THE INVENTION

Figure 1:
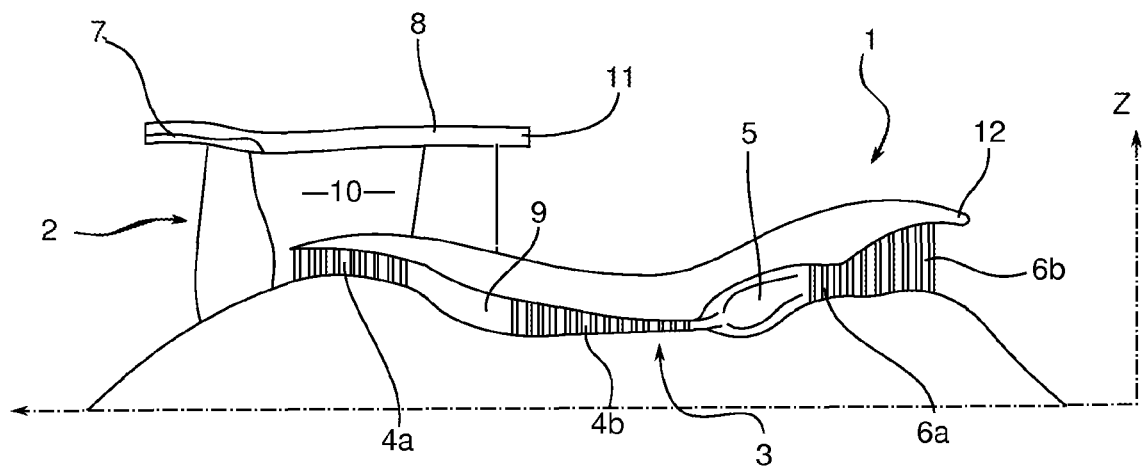
FIG. 1 is a partial axial sectional view of an example of a turbine engine to which the invention applies.

FIG. 1 shows an axial and partial cross-sectional view of a turbine engine 1 of longitudinal axis X to which the invention applies. The turbine engine shown is a dual flow, dual body turbine engine intended to be mounted on an aircraft according to the invention. Of course, the invention is not limited to this type of turbine engine.

This dual flow turbine engine 1 generally comprises a fan 2 mounted upstream of a gas generator 3. In the present invention, and in general, the terms "upstream" and "downstream" are defined with respect to the circulation of gases in the turbine engine and here along the longitudinal axis X (and even from left to right in FIG. 1). The terms "axial" and "axially" are defined with respect to the longitudinal axis X. Similarly, the terms "radial", "internal" and "external" are defined with respect to a radial axis Z perpendicular to the longitudinal axis X and with respect to the distance from the longitudinal axis X.

The gas generator 3 comprises, from upstream to downstream, a low-pressure compressor 4a, a high-pressure compressor 4b, a combustion chamber 5, a high-pressure turbine 6a and a low-pressure turbine 6b.

The fan 2, which is surrounded by a fan casing 7 carried by a nacelle 8, divides the air entering the turbine engine into a primary air flow which passes through the gas generator 3 and in particular in a primary vein 9, and a secondary air flow which circulates around the gas generator in a secondary vein 10.

The secondary air flow is ejected through a secondary nozzle 11 terminating the nacelle while the primary air flow is ejected outside the turbine engine via an ejection nozzle 12 located downstream of the gas generator 3.

The high-pressure turbine 6a, like the low-pressure turbine 6b, comprises one or more stages. Each stage comprises a stator vane mounted upstream of a moving vane. The stator vane comprises a plurality of stator or stationary vanes, referred to as turbine stator vane, which are circumferentially distributed around the longitudinal axis X. The moving vane comprises a plurality of moving vanes that are equally circumferentially distributed around a disc centred on the longitudinal axis X. The turbine stator vanes divert and accelerate the aerodynamic flow out of the combustion chamber towards the moving vanes so that they are driven in rotation.

Figure 2:
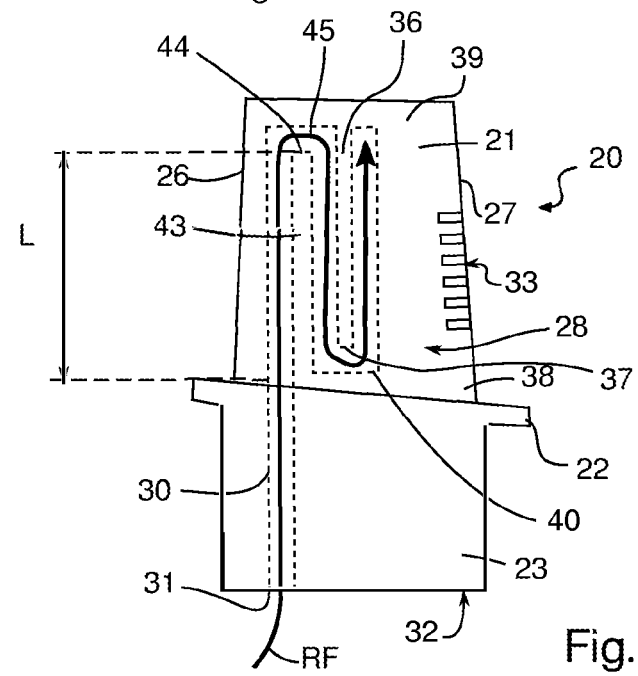
FIG. 2 schematically represents an axial section of a turbine engine vane with a cooling circuit according to the invention.
Figure 3:
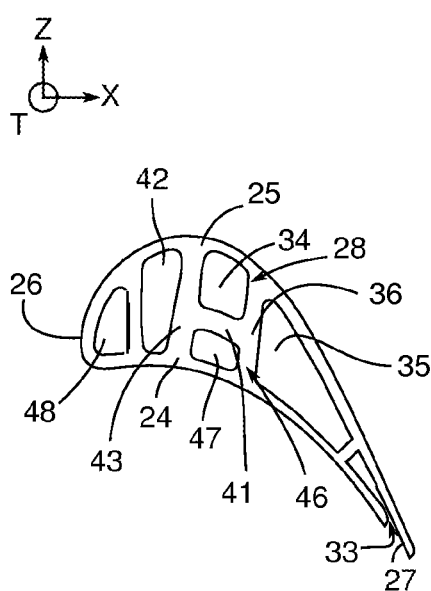
FIG. 3 is a radial cross-sectional view of a blade of a turbine engine vane comprising cooling circuits with various cavities according to the invention.
Figure 4:
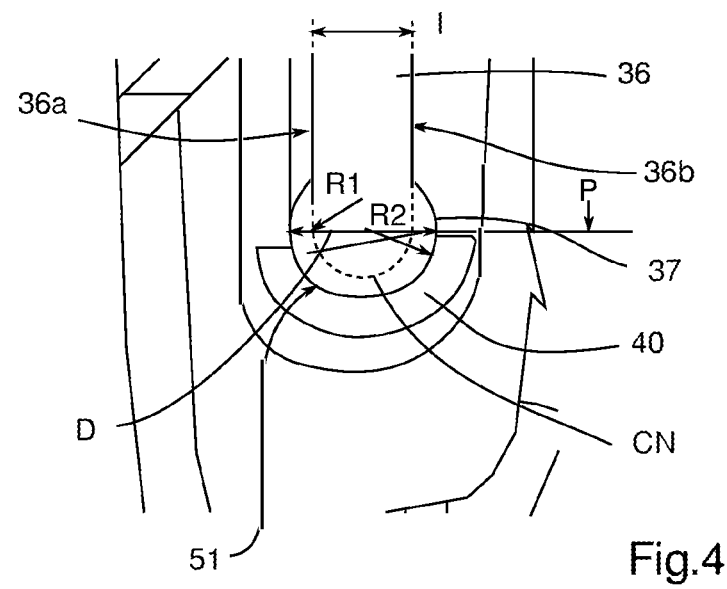
FIG. 4 is a partial and axial view of a cooling circuit of a vane cooled at the level of a curved passage or turnaround according to the invention.

With reference to FIGS. 2 to 4, each turbine vane (and here a high-pressure turbine moving vane 20) comprises a blade 21 rising radially from a platform 22. The latter is carried by a foot 23 which is intended to be implanted in one of the corresponding grooves in the turbine disc. Each blade 21 comprises a pressure wall 24 and a suction wall 25 which are connected upstream by a leading edge 26 and downstream by a trailing edge 27. The pressure and suction walls are opposite each other along a transverse axis T which is perpendicular to the longitudinal and radial axes.

The vane 20 comprises a first cooling circuit 28 which is arranged inside the blade and which is intended to cool the walls of the blade subjected to the high temperatures of the primary air flow leaving and passing through the combustion chamber 5. The first cooling circuit 28 comprises a plurality of cavities which communicate with each other so as to form a trombone-type duct. The latter comprises several passages or turnarounds (of about 180°) so that a coolant, in this case cooling air, sweeps over the entire blade and up and down along the radial axis. This optimises the cooling of the blade.

The root 23 comprises a supply channel 30 which comprises a cooling air inlet 31 taken from upstream of the combustion chamber such as from the low-pressure compressor and which opens into the trombone-type duct. The channel 30 also opens into a radially internal face 32 of the root of the vane which includes the cooling air inlet. The first cooling circuit 28 also includes outlet orifices 33 which are arranged in the vicinity of the trailing edge 27 of the blade. The orifices 33 are oriented substantially along the longitudinal axis X and are aligned and evenly distributed substantially along the radial axis. In this way, the cooling air RF circulating from the root of the vane passes through the cavities within the blade and into the outlet orifices 33.

As illustrated in detail in FIG. 3, the first cooling circuit 28 comprises a number of cavities arranged successively from the upstream to the downstream of the blade. In particular, a first cavity 34 and a second cavity 35 each extend along the radial axis in the blade. The second cavity 35 is arranged downstream of the first cavity 34 along the direction of circulation of the cooling air (and from the upstream to the downstream along the longitudinal axis X). The first cavity 34 and the second cavity 35 are separated, at least partly, by a first radial partition 36 which has a radially internal free end 37, here semi-cylindrical. The latter is located at the level of the root connection end 38 of the vane (radially opposite the free end 39 of the blade). The free end 39 of the blade also comprises a closing wall (not shown) which allows cooling air to be contained within the blade for cooling. The first partition 36 is connected to the closure wall at its radially external end (opposite its radially internal free end 37).

With reference to FIG. 4, the first cavity 34 and the second cavity 35 are connected (and/or communicate with each other) by a first coolant passage 40 which is located at the lower part of the radial partition 36, along the radial axis, and which is demarcated at least partly by the radially internal free end 37.

The first radial partition 36 connects a first wall with a second wall opposite substantially along the transverse axis. In the example shown, the first wall is in contact with the external environment of the blade subjected to the hot gas flows and is formed by the suction side wall 25. The second wall is formed by an internal wall 41 which extends along the radial axis on the one hand and along a direction substantially parallel to the chord of the vane (or substantially along the longitudinal axis X) on the other hand.

Alternatively, the first wall is formed by the pressure wall, since this is also subjected to the hot gas flows. In this case, the first radial partition 36 extends transversely between the pressure wall 24 and the internal wall 41, to which it is connected with respective connection areas. Alternatively, the first partition 36 is connected to the pressure wall 24 and the suction wall 25, between which it extends transversely.

As can be seen in FIG. 4 in detail, the first radial partition 36 has a substantially constant thickness or width I over most of its radial length L. The radially internal free end 37 is enlarged (or comprises a widening) by having a general transverse section substantially in the form of a keyhole. The enlargement is substantially constant along the transverse axis (and between the pressure wall 24 and the suction wall 25). In particular, the transverse section is circular or semicircular with a predetermined radius R2. The axis of the predetermined radius is perpendicular to the radial axis. The radially internal free end comprises a cylindrical external surface 51 and which connects two opposite flanks 36a, 36b of the first radial partition 36 along the chord of the blade (or along the longitudinal axis). Such a configuration forms a local thickening of the partition in order to be able to enlarge the value of a fillet CN of circular cross-section with a nominal radius R1 (shown in dotted lines) of a free end of a conventional partition of the prior art. Furthermore, the form of the keyhole is defined by the fact that the diameter D of the free end defined in a plane P passing through the axis thereof and perpendicular to the radial axis is greater than the width I of the partition 36.

In the present example, the value of the predetermined radius R2 is greater than the nominal radius R1. In particular, the predetermined radius is between 1.2*R1 and 2*R1. In the example embodiment shown in FIG. 4, the predetermined radius R2 is 1.5 times the radius R1.

The first cooling circuit 28 also includes a third cavity 42 which extends radially inside the blade. The third cavity is disposed upstream of the first cavity in the direction of circulation of the cooling air. The third cavity is separated at least partly from the first cavity by a second radial partition 43 which comprises a radially external free end 44. The third cavity and the first cavity are connected by a second coolant passage 45 which is demarcated at least partly by the radially external free end. The closure wall also demarcates the second passage 45.

The third cavity 42, the first cavity 34 and the second cavity 35 arranged successively in the direction of circulation of the coolant form the trombone-type duct.

The blade comprises a second cooling circuit 46 which also allows to cool the blade. The second cooling circuit comprises a pressure cavity 47 which extends radially inside the vane. The pressure cavity 47 is specifically for cooling the pressure wall and the upper part of the blade along the radial axis. The air that is injected into this cavity can exit the blade through the outlet orifices or through other orifices that would be located on the pressure wall for example. As can be seen in FIG. 3, the pressure cavity 47 extends transversely between the internal wall 41 and the pressure wall 24. In other words, the second cavity 35 transversely covers the first cavity 34 and the pressure cavity 47. Its length is substantially the same as that of the first cavity in the direction of circulation of the cooling air (axial direction).

The second cooling circuit is independent of the first cooling circuit.

Upstream of the third cavity 42 is arranged an upstream cavity 48 which extends radially along the leading edge 26.

The first and second partitions 36, 43 are formed in one piece with the vane.

Advantageously, but not restrictively, the vane is made of a metal alloy and according to a manufacturing method using the lost-wax metal casting technique or lost-wax pattern metal casting technique. The metal alloy is preferably nickel-based and may be monocrystalline.

This method comprises a first step of manufacturing one or more metal casting cores. In the present example, the vane comprising a blade provided with several coolant circulation cavities is made from several metal casting cores forming a metal casting assembly. In particular, the latter comprises a first core 50 and a second core 51 which are made of a refractory material such as a ceramic material.

The first core 50 has the complementary form of the trombone-type duct in the blade.

Figure 5:
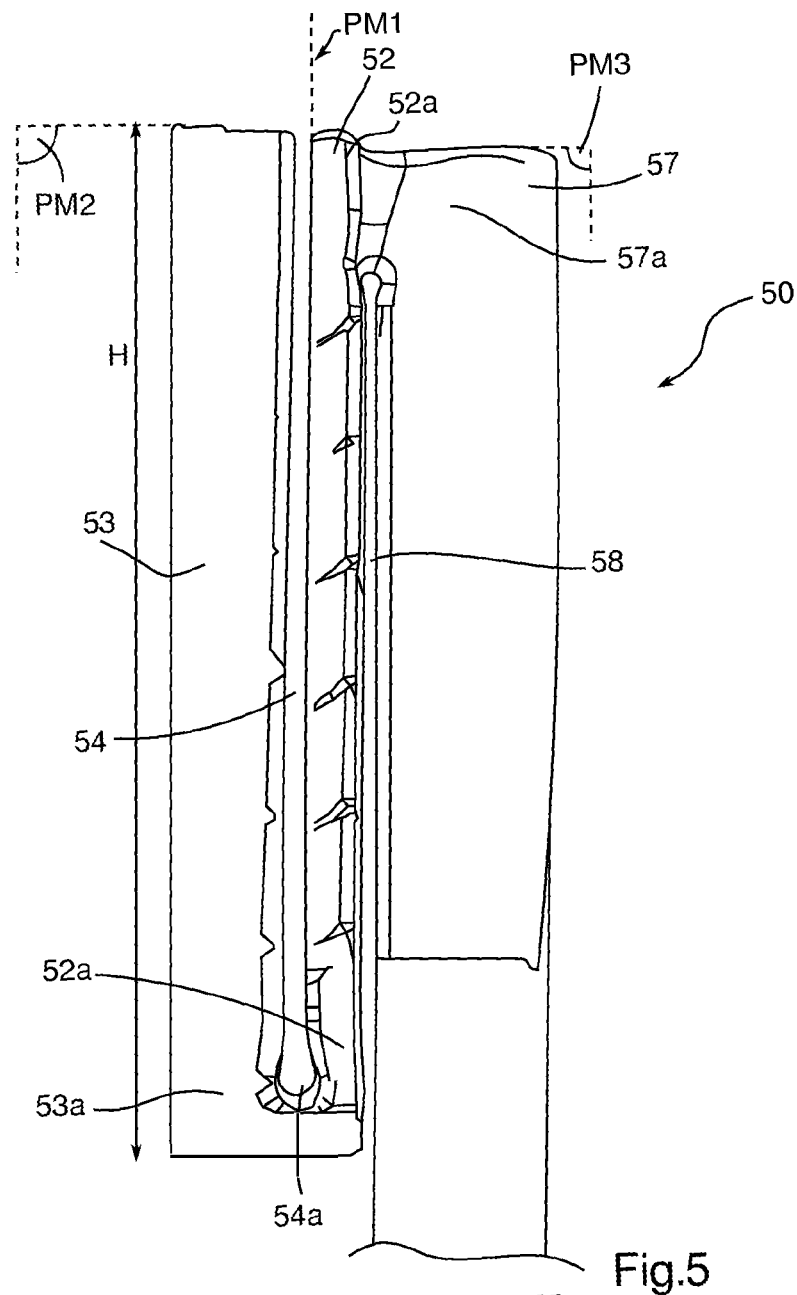
FIG. 5 is a schematic view of an example of a metal casting core intended to enable the production of a turbine engine vane by a manufacturing method using the molten wax technique according to the invention.
Figure 6:
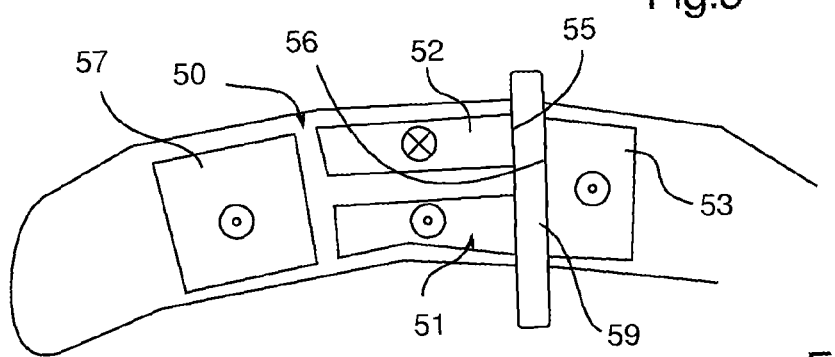
FIG. 6 schematically illustrates the arrangement of metal casting cores with respect to each other for the manufacture of a turbine engine vane according to the invention.

With reference to FIGS. 5 and 6, the first core 50 is elongated along a radial height (vertical in the plane of FIG. 5). The first core has a first wing 52 intended to form the first coolant circulation cavity 34 in the blade and a second wing 53 intended to form the second coolant circulation cavity 35 in the blade. The first wing is defined substantially in a median plane PM1 orthogonal to the median plane PM2 of the second wing 53. The first wing 52 and the second wing 53 are spaced apart along a first substantially constant space 54 along a majority of the radial height of the first and second wings. The first wing and the second wing are connected at their respective first ends 52a, 53a. These are intended to form the first passage 40 in the blade when completed.

The space 54 is intended to form the first radial separating partition 36 between the first and second cavities. The space is demarcated by a side 55 of the first wing and a side portion 56 of the second wing. As can be seen in FIG. 5, the space 54 is enlarged (forming an enlarged space 54a or enlargement) at the junction of the first ends of the first and second wings by having a transverse section substantially in the form of a keyhole. The transverse section of the enlarged space is circular or semi-circular with the predetermined radius R2. This is the negative form of the radially internal free end 37 in the form of a keyhole of the first radial partition 36.

The first core 50 also includes a third wing 57 which is elongated along a radial height and is intended to form the third cavity 42 of the blade. The third wing is defined in a median plane PM3 substantially orthogonal to the median plane PM1. The median planes PM3 and PM2 are substantially parallel. The third wing 57 is also connected to the first wing at their second ends. The second end 52b of the first wing is radially opposite its first end 52a. In particular, the second wing 53 extends on one side of the first wing and the third wing 57 extends on the other side of the first wing. Similarly, a second space 58 is provided between the first and third wings, so as to form the second partition 43. The second space may also be enlarged at the junction of the second ends with a transverse section substantially in the form of a keyhole. The second ends are intended to form the second passage communicating fluidly with the first and third coolant circulation cavities in the blade.

The third wing also extends along the radial height to form the channel 30 extending into the root of the vane.

The first core 50 and the second core 51 are joined together by at least one connecting element 59 to hold them in position with respect to each other. The connecting element 59 is arranged in the enlarged space of the first space with a form-fit in a direction perpendicular to the radial height. Advantageously, there is a clearance between the cores and the connecting element 59 so as not to constrain them too strongly. In particular, the connecting element has a circular axial section. The enlarged space then forms a housing for the connecting element 59 which is radially locked in position. The connecting element 59 can be inserted on the pressure side or suction side of the assembled metal casting assembly.

In this way, as can be seen from the schematic representation of the arrangement of the cores with each other in FIG. 6, the elongated connecting element 59 extends between the first wing 52 and the second wing 53 axially but also between the first core 51 and the second wing 53 axially. The second core 51 abuts against the connecting element to maintain its position, and, in particular, during the various stages of the method. In particular, if the core 51 deforms and tends to get too close to the core 53, in particular to the wing 53, the connecting element will act as an abutment. In this example, the connecting element comprises a pin or stud made of a metallic material or a metallic alloy. Advantageously but not restrictively, the pin comprises a platinum (Pt). Other connecting elements may of course be installed at other locations for holding the cores together, such as in the second enlarged space. It is understood that the connecting element (here the pin) comprises a constant cross-section so that the distance between the core 51 and the second wing 53, and the distance between the first wing 52 and the second wing 53, at the expanded space is greater than or equal to the diameter of the connecting element. Advantageously, the above-mentioned distances are substantially identical.

In a further step of the method, wax or an equivalent material is injected around the cores, which are advantageously, but not restrictively, previously arranged in a press. Once the wax has cooled, we obtain a pattern comprising the cores embedded in the wax. The cores have held their position by means of the connecting element 59.

The pattern is arranged on a column with other similar patterns to form a cluster.

The method further comprises making a shell of refractory material around the cluster and acting as a mould. The refractory material is in the present example a ceramic. The shell is made by immersing the cluster several times in a ceramic slip.

In a further step of the method, molten metal is poured or cast inside the shell in order to fill the cavities obtained when the wax is removed from the patterns and intended to form the metal pieces, in this case the turbine vanes. Indeed, prior to this metal pouring step, a wax removal step is performed.

The connecting element 59 is "dissolved" or embedded in the material forming the turbine engine vane. The connecting element 59 forms a single piece with the vane. The connecting element 59 also ensures the thickness of material at the radially internal free end 37 of the radial partition 36.

When the shell is cooled and solidified, a shakeout step allows to destroy the shell and cores in the metal pieces (vane) so as to reveal the final vane and the coolant circulation cavities.

The invention claimed is:

1. A metal casting assembly for the manufacture of a turbine engine vane comprising a blade extending along a radial axis and a first cooling circuit arranged inside the blade, the first cooling circuit comprising a first cavity and a second cavity disposed downstream of the first cavity in a direction of circulation of a coolant in the blade, the first cavity and the second cavity being at least partly separated by a first radial partition having a radially internal free end which at least partly demarcates a first coolant passage connecting the first and second cavities, the assembly comprising a first core elongated along a radial height and which comprises a first wing intended to form the first cavity and a second wing intended to form the second cavity, the first wing and second wings being spaced apart along first space which is substantially constant along a majority of their radial height and being connected at one of their first ends, the first space being intended to form the first radial partition which separates the first and second cavities of the blade, the first space being enlarged at the first ends of the first wing and second wings, by having a transverse section substantially in the form of a keyhole, wherein the assembly comprises a second core elongated along the radial height and an elongated connecting element which is at least partly accommodated in the first space enlarged in a transverse direction perpendicular to the radial height and configured to hold the second core in position with respect to the first core.

2. The assembly according to claim 1, wherein the first core comprises a third wing intended to form a third cavity of the blade and which is connected at its second end to a second end of the first wing, the first wing and the third wing being spaced apart along a second space substantially constant along a majority of their radial height.

3. The assembly according to claim 2, wherein the second space is enlarged at the second ends of the first wing and third wings by having a transverse section substantially in the form of a keyhole.

4. The assembly according to claim 1, wherein the connecting element has a circular cross-section with a form-fit to the first space which is enlarged, the connecting element being radially locked in the first space which is enlarged.

5. The assembly according to claim 1, wherein the first core is configured to form the first cooling circuit.

6. The assembly according to claim 5, wherein the first and second cores comprise a ceramic material.

7. The assembly according to claim 1, wherein the second core is configured to form a second cooling circuit intended to be arranged in the blade, the second cooling circuit comprising a pressure cavity disposed on the one hand adjacent to a pressure wall of the blade and on the other hand between a third cavity and the second cavity along the direction of circulation of the coolant in the blade.

8. The assembly according claim 1, wherein the first wing is defined in a median plane PM1 which is substantially orthogonal to a median plane PM2 in which the second wing is defined.

9. A lost wax method for manufacturing a turbine engine vane, wherein the method comprises the following steps:
assembling a first core and a second core of a metal casting assembly with respect to each other with at least one connecting element which is elongated and inserted in an enlarged space in the form of a keyhole in a direction transverse to a radial height of a first wing and a second wing, the second core abutting against the at least one connecting element,
injecting wax so as to encapsulate the first and second cores assembled with the at least one connecting element and form a pattern,
manufacturing a shell enveloping the pattern,
pouring molten metal into the shell so as to form the turbine engine vane, and
shaking out the shell and the first and second cores so as to release the turbine engine vane and form first and second cavities of a first cooling circuit in a blade.

10. The method according to claim 9, wherein in the step of pouring molten metal, the at least one connecting element is embedded in the molten metal so as to form a single piece with the blade and to form a radially internal free end of a first radial partition of transverse section substantially in the form of a keyhole.

* * * * *

UNITED STATES PATENT AND TRADEMARK OFFICE
CERTIFICATE OF CORRECTION

PATENT NO. : 11,808,172 B2
APPLICATION NO. : 17/439580
DATED : November 7, 2023
INVENTOR(S) : Romain Pierre Cariou et al.

It is certified that error appears in the above-identified patent and that said Letters Patent is hereby corrected as shown below:

On the Title Page

In Item (72), Line 1, please replace "Romaine Pierre Cariou" with --Romain Pierre Cariou--.

Signed and Sealed this
Seventeenth Day of September, 2024

Katherine Kelly Vidal
*Director of the United States Patent and Trademark Office*